(12) United States Patent
Favreau et al.

(10) Patent No.: US 10,082,588 B2
(45) Date of Patent: Sep. 25, 2018

(54) ADAPTIVE STRUCTURE-ORIENTED OPERATOR

(71) Applicants: Vincent Favreau, Spring, TX (US); Gianni Matteucci, Houston, TX (US); Prasad Sumant, The Woodlands, TX (US)

(72) Inventors: Vincent Favreau, Spring, TX (US); Gianni Matteucci, Houston, TX (US); Prasad Sumant, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 336 days.

(21) Appl. No.: 14/944,575

(22) Filed: Nov. 18, 2015

(65) Prior Publication Data

US 2016/0216390 A1    Jul. 28, 2016

Related U.S. Application Data

(60) Provisional application No. 62/106,488, filed on Jan. 22, 2015.

(51) Int. Cl.
 *G01V 1/00* (2006.01)
 *G01V 1/30* (2006.01)

(52) U.S. Cl.
 CPC ............. *G01V 1/30* (2013.01); *G01V 1/302* (2013.01); *G01V 1/306* (2013.01); *G01V 2210/64* (2013.01)

(58) Field of Classification Search
 None
 See application file for complete search history.

(56) References Cited

U.S. PATENT DOCUMENTS

| 4,916,615 A | 4/1990 | Chittimeni |
| 4,992,995 A | 2/1991 | Favret |
| 5,047,991 A | 9/1991 | Hsu |
| 5,265,192 A | 11/1993 | McCormack |
| 5,274,714 A | 12/1993 | Hutcheson et al. |
| 5,416,750 A | 5/1995 | Doyen et al. |
| 5,444,619 A | 8/1995 | Hoskins et al. |
| 5,465,308 A | 11/1995 | Hutcheson et al. |
| 5,539,704 A | 7/1996 | Doyen et al. |

(Continued)

FOREIGN PATENT DOCUMENTS

| CN | 103412331 | 11/2013 |
| WO | WO 99/64896 | 12/1999 |

(Continued)

OTHER PUBLICATIONS de Groot, P., et al., (2006), "How to Create and Use 3D Wheeler Transformed Seismic Volumes", SEG/New Orleans 2006 Annual Meeting, pp. 1038-1042.

(Continued)

*Primary Examiner* — Aditya Bhat
(74) *Attorney, Agent, or Firm* — ExxonMobil Upstream Research Company-Law Department (57) ABSTRACT

A method, including: growing, with a computer, an adaptive structure-oriented operator from a central computation location within seismic data using at least one of dip lateral variations, strike lateral variations, dip vertical variations, or strike vertical variations.

11 Claims, 7 Drawing Sheets

(56) References Cited

U.S. PATENT DOCUMENTS

| | | | |
|---|---|---|---|
| 5,586,082 A | 12/1996 | Anderson et al. |
| 5,677,893 A | 10/1997 | de Hoop et al. |
| 5,852,588 A | 12/1998 | de Hoop et al. |
| 5,940,777 A | 8/1999 | Keskes |
| 6,052,650 A | 4/2000 | Assa et al. |
| 6,226,596 B1 | 5/2001 | Gao |
| 6,236,942 B1 | 5/2001 | Bush |
| 6,295,504 B1 | 9/2001 | Ye et al. |
| 6,363,327 B1 | 3/2002 | Wallet et al. |
| 6,411,903 B2 | 6/2002 | Bush |
| 6,466,923 B1 | 10/2002 | Young |
| 6,473,696 B1 | 10/2002 | Onyia et al. |
| 6,526,353 B2 | 2/2003 | Wallet et al. |
| 6,574,565 B1 | 6/2003 | Bush |
| 6,574,566 B2 | 6/2003 | Grismore et al. |
| 6,618,678 B1 | 9/2003 | Van Riel |
| 6,625,541 B1 | 9/2003 | Shenoy et al. |
| 6,725,163 B1 | 4/2004 | Trappe et al. |
| 6,735,526 B1 | 5/2004 | Meldahl et al. |
| 6,751,558 B2 | 6/2004 | Huffman et al. |
| 6,754,380 B1 | 6/2004 | Suzuki et al. |
| 6,754,589 B2 | 6/2004 | Bush |
| 6,757,614 B2 | 6/2004 | Pepper et al. |
| 6,771,800 B2 | 8/2004 | Keskes et al. |
| 6,801,858 B2 | 10/2004 | Nivlet et al. |
| 6,804,609 B1 | 10/2004 | Brumbaugh |
| 6,847,895 B2 | 1/2005 | Nivlet et al. |
| 6,882,997 B1 | 4/2005 | Zhang et al. |
| 6,941,228 B2 | 9/2005 | Toelle |
| 6,950,786 B1 | 9/2005 | Sonneland et al. |
| 6,957,146 B1 | 10/2005 | Taner et al. |
| 6,970,397 B2 | 11/2005 | Castagna et al. |
| 6,977,866 B2 | 12/2005 | Huffman et al. |
| 6,988,038 B2 | 1/2006 | Trappe et al. |
| 7,006,085 B1 | 2/2006 | Acosta et al. |
| 7,053,131 B2 | 5/2006 | Ko et al. |
| 7,092,824 B2 | 8/2006 | Favret et al. |
| 7,098,908 B2 | 8/2006 | Acosta et al. |
| 7,162,463 B1 | 1/2007 | Wentland et al. |
| 7,184,991 B1 * | 2/2007 | Wentland | G01V 11/00 706/14 |
| 7,188,092 B2 | 3/2007 | Wentland et al. |
| 7,203,342 B2 | 4/2007 | Pederson |
| 7,206,782 B1 | 4/2007 | Padgett |
| 7,222,023 B2 | 5/2007 | Laurenet et al. |
| 7,243,029 B2 | 7/2007 | Lichman et al. |
| 7,248,258 B2 | 7/2007 | Acosta et al. |
| 7,248,539 B2 | 7/2007 | Borgos et al. |
| 7,266,041 B1 | 9/2007 | Padgett |
| 7,295,706 B2 | 11/2007 | Wentland et al. |
| 7,295,930 B2 | 11/2007 | Dulac et al. |
| 7,308,139 B2 | 12/2007 | Wentland et al. |
| 7,453,766 B1 | 11/2008 | Padgett |
| 7,453,767 B1 | 11/2008 | Padgett |
| 7,463,552 B1 | 12/2008 | Padgett |
| 7,502,026 B2 | 3/2009 | Acosta et al. |
| 7,658,202 B2 | 2/2010 | Wiley et al. |
| 7,697,373 B1 | 4/2010 | Padgett |
| 7,881,501 B2 | 2/2011 | Pinnegar et al. |
| 8,010,294 B2 | 8/2011 | Dorn et al. |
| 8,027,517 B2 | 9/2011 | Gauthier et al. |
| 8,055,026 B2 | 11/2011 | Pedersen |
| 8,065,088 B2 | 11/2011 | Dorn et al. |
| 8,121,969 B2 | 2/2012 | Chan et al. |
| 8,128,030 B2 | 3/2012 | Dannenberg |
| 8,219,322 B2 | 7/2012 | Monsen et al. |
| 8,326,542 B2 | 12/2012 | Chevion et al. |
| 8,346,695 B2 | 1/2013 | Peper et al. |
| 8,358,561 B2 | 1/2013 | Kelly et al. |
| 8,363,959 B2 | 1/2013 | Boiman et al. |
| 8,380,435 B2 | 2/2013 | Kumaran et al. |
| 8,385,603 B2 | 2/2013 | Beucher et al. |
| 8,447,525 B2 | 5/2013 | Pepper et al. |
| 8,463,551 B2 | 6/2013 | Aarre |
| 8,515,678 B2 | 8/2013 | Pepper et al. |
| 8,625,885 B2 | 1/2014 | Brinson, Jr. et al. |
| 8,803,878 B2 | 8/2014 | Andersen et al. |
| 8,843,353 B2 | 9/2014 | Posamentier et al. |
| 9,122,956 B1 | 9/2015 | Fink |
| 9,128,203 B2 | 9/2015 | Al-Dossary et al. |
| 2005/0137274 A1 | 6/2005 | Ko et al. |
| 2005/0171700 A1 | 8/2005 | Dean |
| 2005/0288863 A1 | 12/2005 | Workman |
| 2006/0115145 A1 | 6/2006 | Bishop |
| 2006/0122780 A1 | 6/2006 | Cohen et al. |
| 2006/0184488 A1 | 8/2006 | Wentland |
| 2007/0067040 A1 | 3/2007 | Ferree |
| 2008/0123469 A1 | 5/2008 | Wibaux et al. |
| 2008/0212841 A1 | 9/2008 | Gauthier et al. |
| 2008/0270033 A1 | 10/2008 | Wiley et al. |
| 2010/0149917 A1 * | 6/2010 | Imhof | G01V 1/345 367/53 |
| 2010/0174489 A1 | 7/2010 | Bryant et al. |
| 2010/0211363 A1 | 8/2010 | Dorn et al. |
| 2010/0245347 A1 | 9/2010 | Dorn et al. |
| 2011/0307178 A1 | 12/2011 | Hoekstra |
| 2012/0072116 A1 | 3/2012 | Dorn et al. |
| 2012/0090001 A1 | 4/2012 | Yen |
| 2012/0117124 A1 | 5/2012 | Bruaset et al. |
| 2012/0150447 A1 | 6/2012 | Van Hoek et al. |
| 2012/0195165 A1 | 8/2012 | Vu et al. |
| 2012/0197530 A1 | 8/2012 | Posamentier et al. |
| 2012/0197531 A1 | 8/2012 | Posamentier et al. |
| 2012/0197532 A1 | 8/2012 | Posamentier et al. |
| 2012/0197613 A1 | 8/2012 | Vu et al. |
| 2012/0257796 A1 | 10/2012 | Henderson et al. |
| 2012/0322037 A1 | 12/2012 | Raglin |
| 2013/0006591 A1 | 1/2013 | Pyrcz et al. |
| 2013/0138350 A1 | 5/2013 | Thachaparambil et al. |
| 2013/0158877 A1 | 6/2013 | Bakke et al. |
| 2013/0338927 A1 | 12/2013 | Kumaran |
| 2014/0081613 A1 | 3/2014 | Dinnusse et al. |
| 2014/0303896 A1 | 10/2014 | Wrobel et al. |
| 2015/0178631 A1 | 6/2015 | Thomas et al. |

FOREIGN PATENT DOCUMENTS

| | | |
|---|---|---|
| WO | WO 2005/017564 | 2/2005 |
| WO | WO 2012/090001 | 7/2012 |

OTHER PUBLICATIONS

Hale, D., "Structure-oriented Smoothing and semblance," Center for Wave Phenomena, Colorado School of Mines, *CWP Report 635*, 10 pgs. (2009).

Liu, Y. et al., "Nonlinear structure-enhancing filtering using plane-wave prediction," *Geophysical Prospecting* 58, pp. 415-427 (2010).

Randen, T. et al., "Atlas of 3D Seismic Attributes," *Mathematical Methods and Modeling in Hydrocarbon Exploration and Production*, 44 pgs. (2005).

* cited by examiner

Background

FIG. 1

Background

ADAPTIVE STRUCTURE-ORIENTED OPERATOR

CROSS-REFERENCE TO RELATED APPLICATION

This application claims the benefit of U.S. Provisional Patent Application 62/106,488 filed Jan. 22, 2015 entitled ADAPTIVE STRUCTURE-ORIENTED OPERATOR, the entirety of which is incorporated by reference herein.

FIELD OF THE INVENTION

This invention relates generally to the field of geophysical prospecting of data for potential hydrocarbon opportunities and, more particularly, to seismic data analysis. Exemplary embodiments described herein generally pertain to imaging subsurface geological layers. More specifically, exemplary embodiments described herein pertain to an adaptive dip-steered/azimuth-steered/normal-steered way of analyzing seismic data.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Seismic data are acquired and processed to help geoscientists visualize and quantify key metrics linked to detecting or assessing the quantity and quality of hydrocarbons potentially present in the subsurface. Seismic datasets are a way to "image" the subsurface geological layers in a way that geoscientists can interpret geological layers and morphologies. Geological layers are characterized by their rock physical, acoustical properties, direction of deposition or continuity, but also by their "structure": direction towards which layers are dipping toward at the current time. The "structure" is characterized by two principal measurements called dip and azimuth that define the exact direction layers are dipping towards in the subsurface. These measurements define the dip and strike direction for any point in the subsurface.

Figure 1:
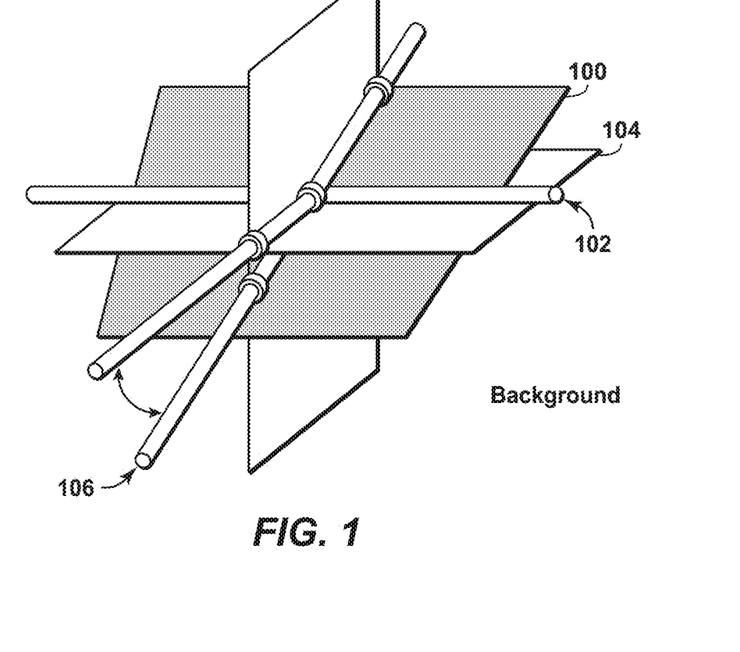
FIG. 1 illustrates the concepts of strike and dip.

FIG. 1 illustrates dip and strike directions. The strike direction of a geological planar feature 100 is a line 102 representing the intersection of that feature 100 with a horizontal plane 104. The strike direction is usually referred to as the "azimuth" or angle, in a horizontal plane, between the strike line 102 and a reference direction (i.e., north or a specified direction like the survey main axis). The dip vector feature 106 is vector which has the steepest angle (relative to the horizontal plane 104) of descent within the same planar feature 100 Dip and strike directions are perpendicular to one another. The dip vector is characterized by its dip and also its dip azimuth which is the direction the dip vector points towards. The dip vector azimuth is 90 degrees rotated compared to the "azimuth" of the planar feature 100. In this paper, the "dip direction" is the direction the dip vector is pointing towards and the "strike direction" is the horizontal vector feature 102.

Figure 2:
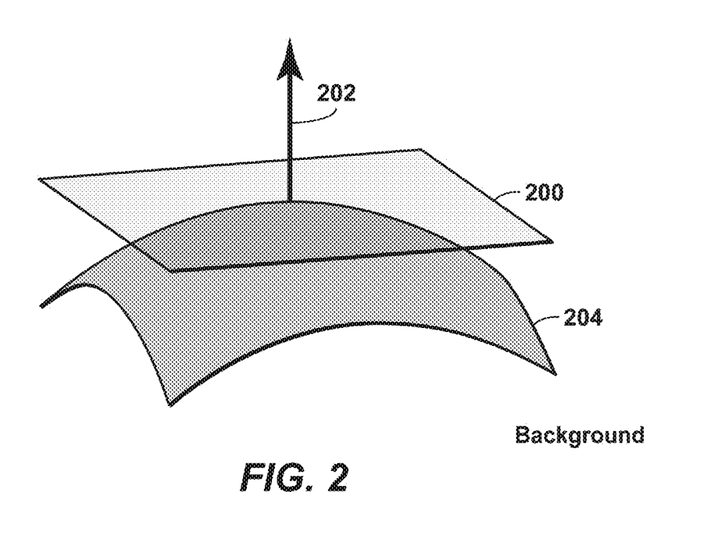
FIG. 2 illustrates a normal vector to a given surface.

The third direction commonly used is the normal to the geological layer and is defined by the vector perpendicular to the plane defined by the dip and strike vectors (i.e. planar feature 100). FIG. 2 illustrates a normal vector to a given surface (from Oleg Alexandrov, 2011). For a given surface, the strike and dip direction define a dip-azimuth plane 200. The normal vector 202 to the surface 204 is the vector perpendicular to the dip-azimuth plane 200.

Extracting valuable information from seismic data, especially three-dimensional (3D) seismic data, can be based on algorithms (or mathematical operations) that use operators in XYZ space. An operator is a way to select in the XYZ or INLINE/CROSSLINE/Z seismic sample points to run operations on.

A classic way of extracting information from seismic data is to use structure guided image processing applied to seismic data. The structure dip and strike directions can be computed in several ways resulting in dip and azimuth data cubes of the same footprint as the seismic data they are computed on (FIG. 1). In order to better relate seismic data measurements to geology, the classic approach in operator design is to use a structure guided operator; namely "dip-steered" or "strike-steered" operator.

Figure 5:
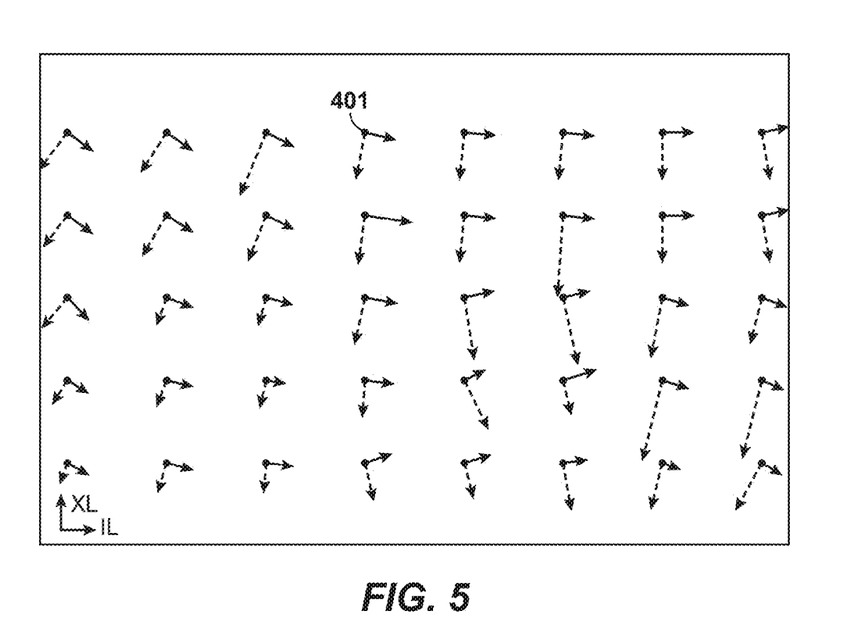
FIG. 5 is a map view of dip and strike vector computation results from seismic data.
Figure 7:
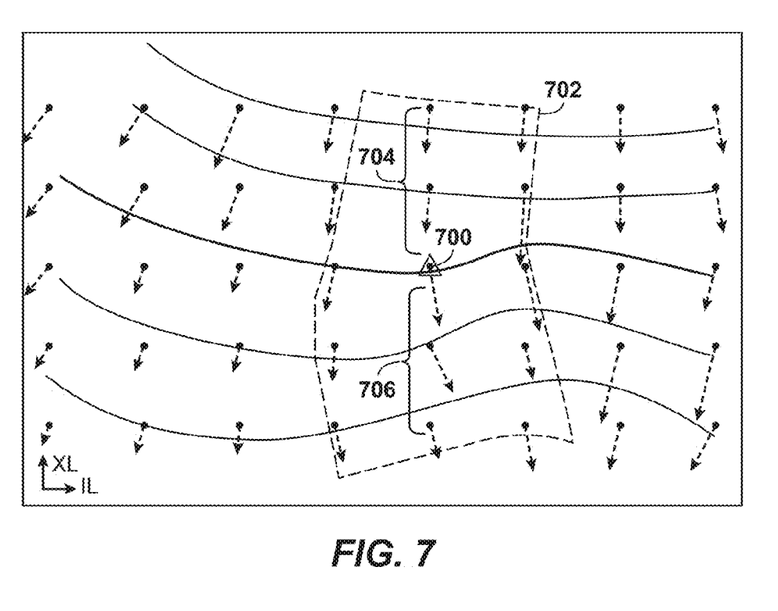
FIG. 7 illustrates a map view of an adaptive dip-steered operator.

The current standard in the industry is to use dip and azimuth (FIGS. 1 and 2) to guide the operator direction in two fashions. The first, for a large operator, the operator direction is either kept constant, inheriting a single dip and azimuth from the computation location for the entire operator (FIGS. 5 and 7). The operator is called "Linear" or local because it uses a unique direction computed at the center of the operator. The major flaw with these approaches is that the lateral variation of dip and strike directions are not fully taken into account. The second is using a cascaded approach where a small operator is run on the data multiple times, recursively, with each iteration's result becoming the input for the next iteration. The cascaded approach fully utilizes the lateral variation of dip and strike, generating the results of a larger operator without the requirement of explicitly populating the larger operator, but requires running multiple times.

For conventional methods, the resulting data point selection by the operator may include data points that are not intended to be selected or miss relevant others.

A technical problem exists in regards to how to properly design the operator using dip and strike direction data to have a meaningful operation result. Trying to select data points in the strike or dip direction would requires an operator that changes direction as it expands away from the central computation location, because dip and strike direction are not the same from point to point. This has not been previously done in the industry.

Further background information can be found in *Nonlinear structure-enhancing filtering using plane-wave prediction*, Liu et al., Geophysical Prospecting, 2010, 58, 415-427; and *Structure-oriented smoothing and semblance*, Hale, Center for Wave Phenomena, Colorado School of Mines.

SUMMARY

A method, including: growing, with a computer, an adaptive structure-oriented operator from a central computation location within seismic data using, alone or in combination, dip lateral variations, azimuth lateral variations, dip vertical variations, or azimuth vertical variations.

In the method, the growing can include searching for neighboring seismic data sample points, relative to the central computation location, by changing a search direction at each seismic data sample point of the adaptive structure-oriented operator.

In the method, the growing can include following a predetermined priority from amongst a dip direction following a dip vector direction, a strike direction following an azimuth vector direction, and a normal vector perpendicular to both the dip and azimuth vectors.

In the method, the growing can include changing direction of the adaptive structure-oriented operator as the adaptive structure-oriented operator expands away from the central computation location.

The method can further include growing the adaptive structure-oriented operator in a strike direction or a dip direction until a predetermined radius in the strike direction or dip direction, respectively, is reached.

In the method, the adaptive structure-oriented operator can be a same size in dip/strike/Normal space for each computation point in the seismic data, but varies in x, y, z, space.

In the method, the seismic data can be two dimensional or three dimensional.

The method can further include: performing an operation on the seismic data sample within the adaptive structure-oriented operator to generate modified seismic data; and performing hydrocarbon management based on the modified seismic data.

In the method, the seismic data sample points can be regularly sampled.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The "Adaptive" Structure-oriented Operator (ASO) presented herein is a refinement to existing concepts of structure guided image processing applied to seismic data in order to better detect seismic amplitude features or enhance seismic data quality. The ASO is a way to select seismic data points using an operator or kernel defined in the dip/azimuth/normal to bed dip direction. In short, the ASO is a dip-steered and/or azimuth and/or normal-steered way of analyzing seismic data that is locally adaptive.

The present technological advancement includes populating a large operator in one go; "growing" it from a central location and using the varying dip and strike lateral and vertical variations to adapt its geometry or shape. By "growing", it is implied that the operator is developed through the data cube using the structural dip and azimuth; this "growing" can be achieved by expanding a geobody using neighborhood cells, sliding planes or lines along one chosen dimension; or following dip, strike and normal direction vectors in a linear fashion in 3D using a chosen dimensional order (i.e. dip then strike then normal, strike then dip then normal, . . . ). The exemplary embodiments discussed herein explain how the ASO changes its search direction at each data point of the operator, which makes the operator adaptive.

The present technological advancement can improve the ability to compute direct hydrocarbon indicators (DHI) attributes, such as Lateral Amplitude Contrast, Down Dip Terminations, and Amplitude Fit to Structure, for example, which are discussed in U.S. Patent Application Publication 2014/0303896 (title: Method for Quantitative Definition of Direct Hydrocarbon Indicators), the entire contents of which are hereby incorporated by reference. Applications of the present ASO technique include, but are not necessarily limited thereto, seismic amplitude feature detection, seismic data labeling, and seismic data enhancement (de-noising). Moreover, the present technological advancement can be used to create improved images of the subsurface, and can be used in the exploration and recovery of hydrocarbons.

Figure 3:
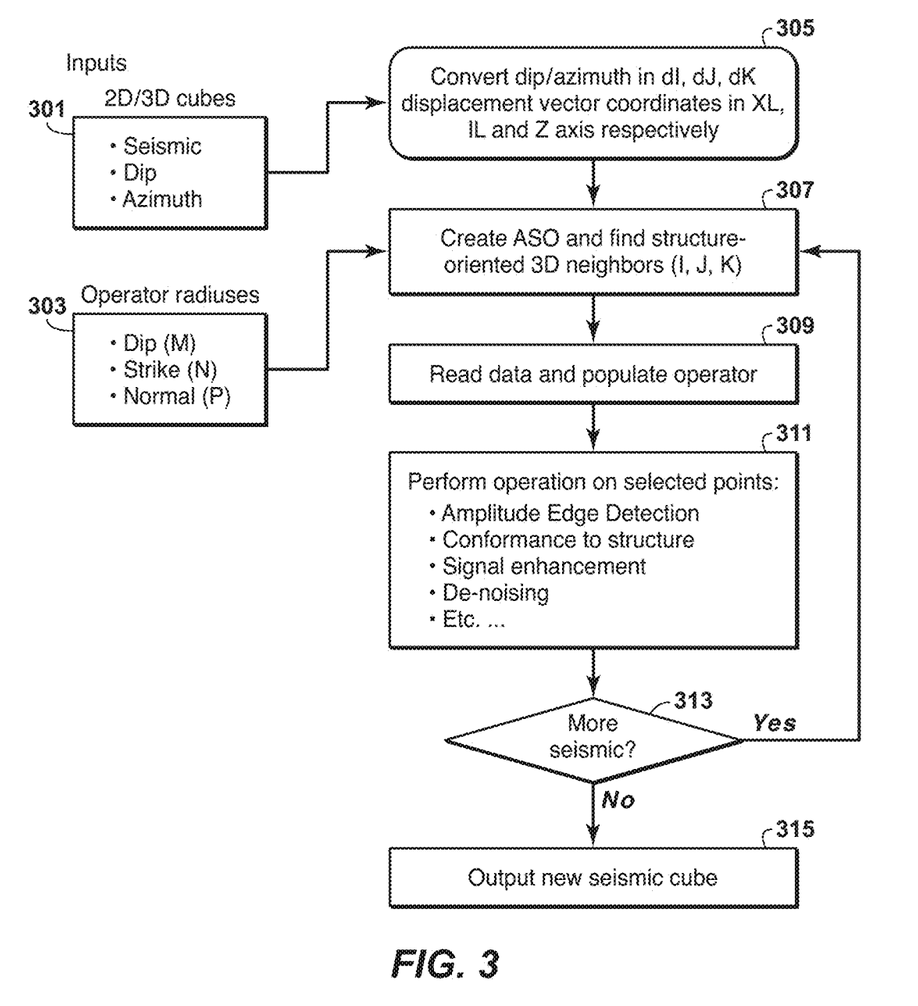
FIG. 3 is an exemplary method of generating an adaptive structure-oriented operator.

FIG. 3 illustrates an exemplary method embodying the present technological advancement. The ASO is a better way to properly find points belonging to a structure-oriented 3D operator of a given geometry in the dip, strike, and normal space.

In step 301, input data is obtained. The input data can be either 2D or 3D cubes of seismic data, along with corresponding dip and/or azimuth data. A seismic cube can have any type of geometry. A dip cube, usually in degrees, is computed on a same geometry as the seismic cube. An azimuth cube, usually in degrees, is computed on a same geometry as the seismic cube, with an angle defined from the XLINE direction (using, Petrel® for example) and not the true North direction. For dip and azimuth in Petrel®, it is assumed that the input cube of seismic data has a cell of the same dimension in each direction (pixel mode). Vector computations are done independently from seismic cell dimensions. In Petrel®, dip and azimuth angles are computed in the pixel space, not the XYZ space.

Figure 4:
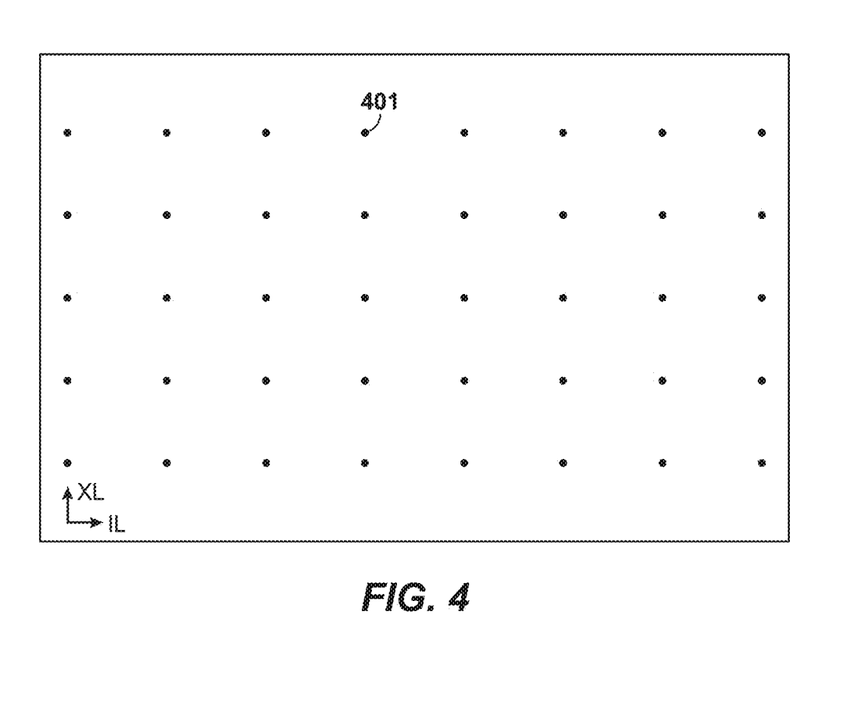
FIG. 4 is an exemplary map view of seismic data locations.

FIG. 4 is a map view (or top view) of 3D seismic data locations 401. The data locations 401 are regularly sampled seismic locations that can be used as computation locations. However, irregular sampling can also be used (i.e. 2D datasets).

FIG. 5 is a map view of the 3D seismic data locations 401 with the strike vectors (solid) and dip vectors (dashed)

displayed for the corresponding regularly sampled seismic data locations. The dashed dip vectors show the direction the geological bed dips; wherein the longer the dip vector the steeper the bed. The solid strike vectors show the strike direction and have the same length (zero dip).

In step 303, user defined operator size or reach is obtained. The user can define the radius in the dip direction (Rdip), radius in the strike direction (Rstrike), and the radius in the normal direction (Rnorm). This will control the size of the ASO.

In step 305, the dip and/or azimuth is converted to dI, dJ and dK displacement vector coordinates on the XL (crossline), IL (inline), and Z axis, repsectively. This is accomplished by computing the projection INLINE, CROSSLINE, and Z axis for the dip and normal vectors. This allows for translating the dip and azimuth input values into discrete steps in all seismic axes for each input sample.

The V vector quantifies the amount of projected distance covered in INLINE, CROSSLINE and Z axis respectively for each step in the dip direction.

$$\text{Normalized dip vector } V = \begin{pmatrix} \cos(\text{dip}) * \sin(\text{azimuth})/\Delta \\ \cos(\text{dip}) * \cos(\text{azimuth})/\Delta \\ \tan(\text{dip}) \end{pmatrix} = \begin{pmatrix} dI \\ dJ \\ dK \end{pmatrix} \quad (1)$$

$$\text{wherein } \Delta = \sqrt{(\cos(\text{dip})^*\sin(\text{azimuth}))^2 + (\cos(\text{dip})^*\cos(\text{azimuth}))^2} \quad (2)$$

The S1 and S2 vectors quantify the amount of projected distance covered in INLINE, CROSSLINE and Z axis respectively for each step in the strike direction.

$$\text{Normalized strike vectors } S1 = \begin{pmatrix} -dJ \\ dI \\ 0 \end{pmatrix} \text{ and } S2 = \begin{pmatrix} dJ \\ -dI \\ 0 \end{pmatrix} \quad (3)$$

The N vector quantifies the amount of projected distance covered in INLINE, CROSSLINE and Z axis respectively for each step in the NORMAL direction.

$$\text{Computing Normal vector } V * V^T = \begin{pmatrix} dIn \\ dJn \\ dKn \end{pmatrix}, \text{ and Normalized Normal vector } N = \begin{pmatrix} dIn \\ dJn \\ dKn \end{pmatrix}/D \quad (4)$$

$$\text{where } D = \sqrt{(dIn)^2 + (dJn)^2 + (dKn)^2} \quad (5)$$

In step 307, the adaptive structured-oriented operators are created and structure-oriented 3D neighbors (I, J, K) are determined. This step includes finding, within the seismic data, all the neighbors from a central computation location (700 in FIG. 7 or 900 in FIG. 9) that are reached by the ASO. Using V, S1, S2, and N, neighboring samples n are found by growing the operator from a central computation point in the normal, strike, and/or dip directions. The number of samples n within the ASO is determined by equation 6.

$$n = (2*R\text{strike}+1)*(2*R\text{norm}+1)*(2*R\text{dip}+1) \text{ samples} \quad (6)$$

There are many ways of growing the operator. For instance one can define priorities, dip direction first from center location as first step, then strike direction from step 1 points as second step and finally normal direction from points grown in steps 1 and 2. Priority can be changed, it could be strike direction first, then dip direction and finally normal direction. Growing can also be done in all directions radially. The choice of priority will result in a different operator result. Depending on the type of operation carried out, users may want to choose different growing schemes. Growing stops when the steps reach the user defined operator reaches in dip, strike and normal. The ASO creates a list of non-discrete INLINE, CROSSLINE and Z axis values as a result of the growing of the operator from a central location.

In step 309, the seismic amplitudes for the n samples selected by the ASO are read, "populating" the operator. This step can involve reading the amplitudes of the closest nodes (no interpolation, also called "snapping") or interpolate the input seismic amplitudes to the non-discrete INLINE, CROSSLINE and Z axis values calculated by the ASO. Interpolation can be done using various interpolation schemes, dip-steered and azimuth-steered or not.

In step 311, a user defined operation is performed on the n amplitude points populated in step 309. Such user defined operations can include determination of median, average, or count, comparing a plurality of the n amplitude points to each other or some other data, performing amplitude edge detection, conformance to structure, signal enhancement, or denoising. Moreover, the n amplitude points can be used to construct an image of the subsurface. This is not an exhaustive list as a user could determine other operations to perform on the n amplitude points. Those of ordinary skill in the art are familiar with the operations that can be carried out on selected samples. The present technological advancement relates to the ASO that properly selects samples using structure dip and/or azimuth measurements as a guide.

In step 313, if additional input cube samples are available, then the process can return to step 307 and a new ASO can be formed for the additional input cube sample. Each new ASO is generated independently of other operators, as the present technological advancement is not a cascaded process.

If there are no more additional input cube samples, then the process can proceed to step 315, wherein a new seismic cube is outputted constructing a new image of the subsurface.

Figure 6:
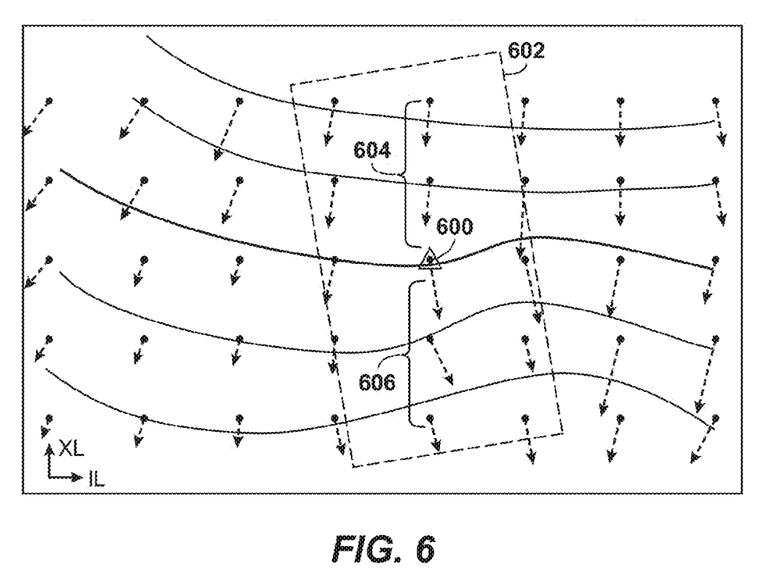
FIG. 6 illustrates a map view of a conventional dip-steered operator.

For comparison purposes. FIG. 6 illustrates a conventional dip-steered operator definition. FIG. 6 is a map view and depicts various contours and dip vectors, wherein 604 indicates updip and 606 indicates downdip. The dip-steered operator 602 is a rectangle centered a computation location 600. The orientation of the dip-steered operator 602 is inherited from the central computation location 600.

FIG. 7 illustrates an adaptive dip-steered operator in accordance with the present technological advancement. FIG. 7 is a map view and depicts various contours and dip vectors, wherein 704 indicates updip and 706 indicates downdip points. The dip-steered operator 702 is a not a rectangle with orientation inherited from the central computation location 700. Rather, in accordance with the present technological advancement, the adaptive dip-steered operator changes its geometry as it grows away from the central computation location point 700. The dip direction is followed laterally (and vertically) and is not assumed constant.

Figure 8:
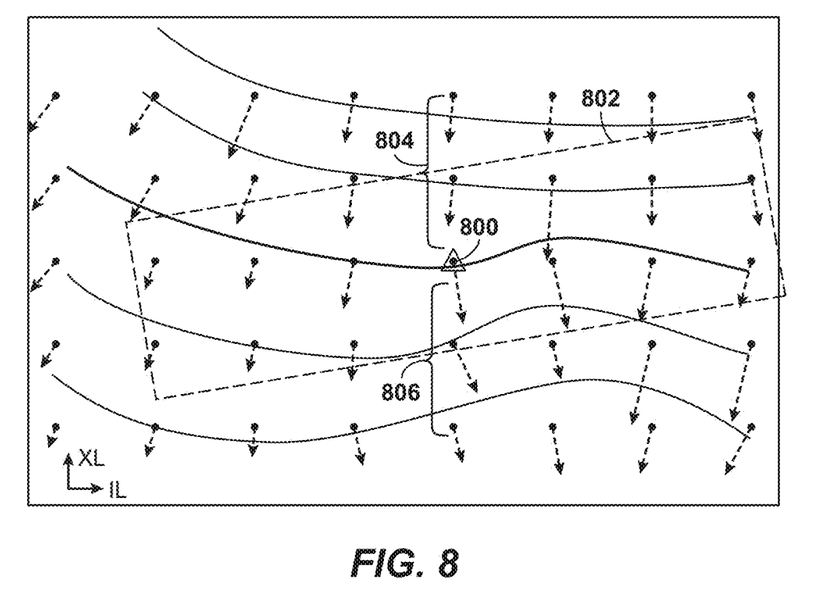
FIG. 8 illustrates a map view of a conventional strike-steered operator.

For comparison purposes. FIG. 8 illustrates a conventional strike-steered operator definition. FIG. 8 is a map view and depicts various contours and dip vectors (strike vectors being perpendicular to the dip vectors), wherein 804 indicates updip and 806 indicates downdip. The strike-steered operator 802 is a rectangle centered a computation location 800. The orientation of the strike-steered operator 802 is inherited from the central computation location 800.

Figure 9:
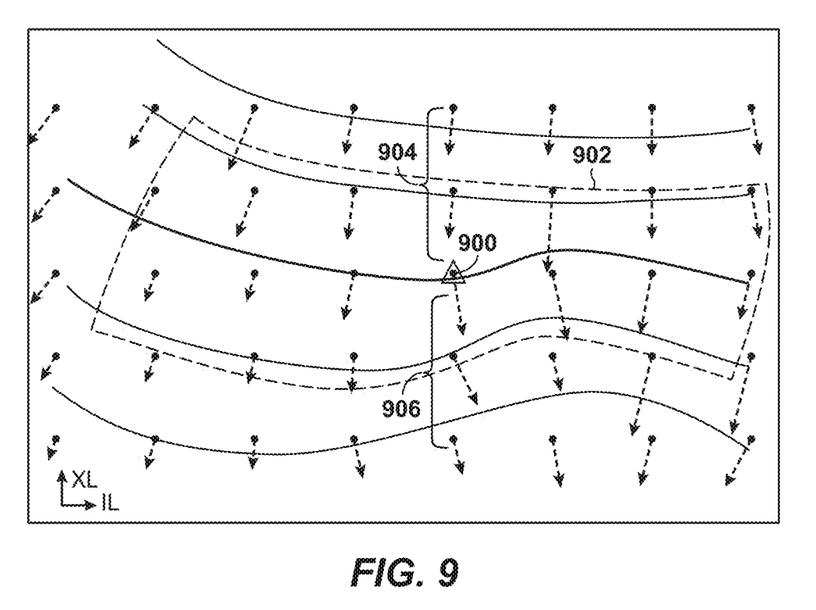
FIG. 9 illustrates a map view of an adaptive strike-steered operator.

FIG. 9 illustrates an adaptive strike-steered operator in accordance with the present technological advancement. FIG. 9 is a map view and depicts various contours and dip vectors (strike vectors being perpendicular to the dip vectors), wherein 904 indicates updip and 906 indicates downdip. The strike-steered operator 902 is a not a rectangle with orientation inherited from the central computation location 900. Rather, in accordance with the present technological advancement, the adaptive strike-steered operator 902 changes its geometry as it grows away from the central computation location point 900. The strike direction is followed laterally (and vertically) and is not assumed constant.

Figure 10:
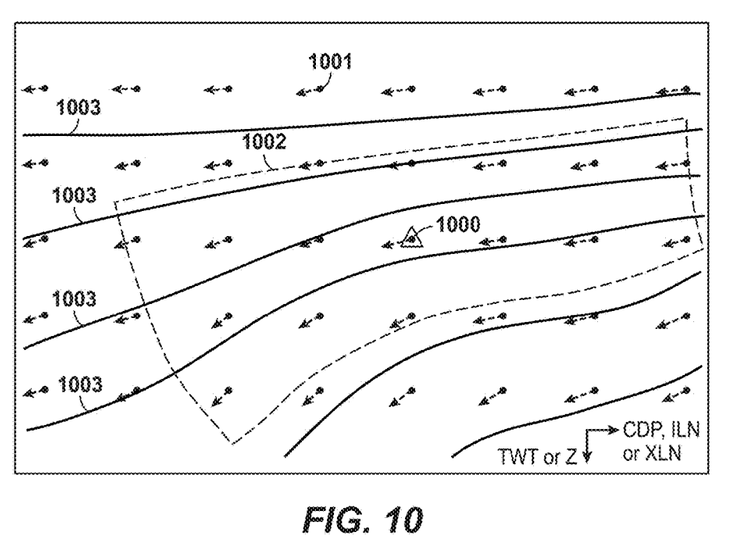
FIG. 10 illustrates a 2D side (or vertical) view of an adaptive structure oriented steered operator.

FIG. 10 illustrates the same example shown in FIGS. 6 and 7, but in a side view. The "structure" is followed adaptively in the dip, strike and normal (strike not shown for graphing purposes) direction resulting in a truly structured adaptive operator. In FIG. 10, seismic data samples 1001 (only one being labeled for clarity) are shown in a vertical plane view. The adaptive structured oriented operated 1002 is centered at computation location 1000 and grown in a manner consistent with the present technological advancement as discussed above. As FIG. 10 is a vertical plane view, the lines 1003 are seismically derived surfaces (as opposed to FIGS. 6 and 7, wherein the lines are contours on a 2D map view) for illustration purposes and are not used for growing the operator.

The present technological advancement includes populating a large operator in one go, "growing" it from a central location and using the varying dip and/or strike lateral and vertical variations to adapt its geometry or shape. The exemplary embodiments in FIGS. 7, 9, and 10 illustrate that the ASO changes its search direction at each data point of the operator, which makes the operator adaptive.

Comparing FIG. 6 to 9 and FIG. 10, those of ordinary skill in the art can appreciate why such an adaptive operator design is superior to classic approaches and shows data selected by the adaptive operator are the points intended to be captured by "dip-steered" or "strike-steered" operator in the first place. The FIGS. 6-9 show a 2D map view example for simplicity, but the normal to bed dip (FIG. 2) is also followed adaptively by the ASO. The structure direction (dip and azimuth) used by the ASO is NOT being recomputed during the process (i.e., the process in FIG. 3 does not need to recompute the structure direction as the ASO is adaptive and possesses the structure direction as input data (dip and azimuth cubes)).

Using ASO versus a conventional structure guided operator allows a user to generate more locally accurate and refined results by eliminating the assumption that the structure direction is unique throughout the entire operator size. The shape of the ASO is solely guided by the variation of the input dip and azimuth fields, varies from computation location to the next, and is not fixed in XYZ space or simulated in a cascaded approach. In the present technological advancement, the ASO size is the same in dip/strike/Normal space for each computation point, but varies in the XYZ space depending upon the input dip and azimuth cubes. The computation of the ASO can be done in one pass (i.e. does not require running multiple iterations) and can fully utilize the lateral and vertical variations of dip and azimuth, namely the "structure" of the seismic data.

Furthermore, the new seismic cube created by the present technological advancement can be used to manage hydrocarbons. As used herein, hydrocarbon management includes acquiring seismic data, hydrocarbon extraction, hydrocarbon production, hydrocarbon exploration, identifying potential hydrocarbon resources, identifying well locations, drilling a well, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 11:
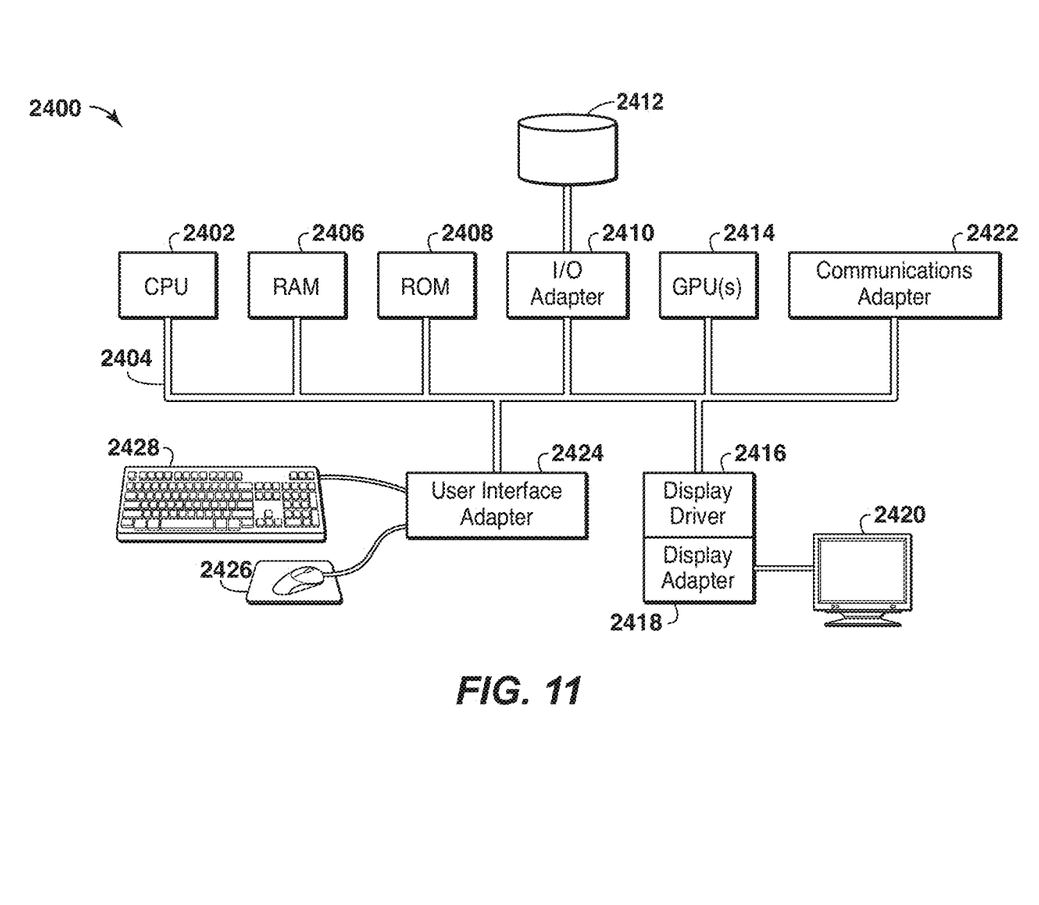
FIG. 11 illustrates a computer system.

FIG. 11 is a block diagram of a computer system 2400 that can be used to generate the ASO. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 11, additional CPUs may be present. Moreover, the computer system 2400 may comprise a networked, multi-processor computer system that may include a hybrid parallel CPU/GPU system. The CPU 402 may execute the various logical instructions according to various teachings disclosed herein. For example, the CPU 2402 may execute machine-level instructions for performing processing according to the operational flow described.

The computer system 2400 may also include computer components such as non-transitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output I/O adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

What is claimed is:

1. A method, comprising:
   selecting a location within 3D seismic data as a central computation location;
   creating, with a computer, an adaptive structure-oriented operator from the central computation location within the 3D seismic data, wherein the creating includes,
   (a) reading precomputed dip and azimuth values to guide the structure-oriented operator creation,
   (b) converting the precomputed dip and azimuth values to dI, dJ, and dK dip direction vectors and structural vectors dInorm, dJnorm, and dKnorm that are normal to dip direction vectors,
   (c) starting from a predetermined 3D seismic point location, following the structural vectors to step in between 3D seismic points and calculating an ending point of one step move along one of dip, strike, or normal direction,
   (d) estimating at the ending point structural vector values and changing guiding vector values for a next step move, along one of dip, strike, or normal direction, and continuing next step moves until a maximum user defined number of steps is reached in a chosen direction,
   (e) repeating the step (d) in multiple different directions, in a user defined order, to create the adaptive structure-oriented operator using a previous ending point to start a next different direction, and
   (f) repeating steps (c) to (e) for all user defined starting locations within the 3D seismic data, creating for each of the starting locations a set of ending points developed adaptively by the structure-oriented operator;
   populating the adaptive structure-oriented operator with seismic attribute values for a seismic data sample encompassed by the adaptive structure-oriented operator; and
   performing, with a computer, an operation on a seismic data sample encompassed by the adaptive structure-oriented operator to generate modified seismic data.

2. The method of claim 1, wherein the creating includes searching for neighboring seismic data sample points, relative to the central computation location, by changing a search direction at each seismic data sample point of the adaptive structure-oriented operator.

3. The method of claim 2, wherein the seismic data sample points are regularly sampled.

4. The method of claim 1, wherein the creating includes following a predetermined priority from amongst a dip direction following a dip vector direction, a strike direction following an azimuth direction, and a normal vector direction perpendicular to both dip and azimuth vectors.

5. The method of claim 1, wherein the creating includes changing direction of the adaptive structure-oriented operator as the adaptive structure-oriented operator expands away from the central computation location.

6. The method of claim 1, further comprising: creating the adaptive structure-oriented operator in a strike direction or a dip direction until a predetermined radius in the strike direction or dip direction, respectively, is reached.

7. The method of claim 1, wherein the adaptive structure-oriented operator is a same size in dip/strike/Normal space for each computation point in the seismic data, but varies in x, y, z, space.

8. The method of claim 1, further comprising:
   performing hydrocarbon management based on the modified seismic data.

9. The method of claim 1, further comprising generating, with a computer, an image of a subsurface region using the modified seismic data.

10. The method of claim 1, wherein the growing includes expanding a geobody using neighboring cells and their dip/dip azimuth structural data.

11. The method of claim 1, wherein the growing includes sliding a plane along a chosen dimension.

\* \* \* \* \*